US012617185B2

(12) United States Patent (10) Patent No.: US 12,617,185 B2
Gomer et al. (45) Date of Patent: May 5, 2026

(54) LAMINATED PANE WITH RETARDATION PLATE

(71) Applicant: SAINT-GOBAIN GLASS FRANCE, Courbevoie (FR)

(72) Inventors: Andreas Gomer, Herzogenrath (DE); Jan Hagen, Herzogenrath (DE); Julian Greverath, Herzogenrath (DE)

(73) Assignee: SAINT-GOBAIN SEKURIT FRANCE, Thourotte (FR)

( * ) Notice: Subject to any disclaimer, the term of this patent is extended or adjusted under 35 U.S.C. 154(b) by 232 days.

(21) Appl. No.: 18/711,043

(22) PCT Filed: Mar. 22, 2023

(86) PCT No.: PCT/EP2023/057259
§ 371 (c)(1),
(2) Date: May 16, 2024

(87) PCT Pub. No.: WO2023/186637
PCT Pub. Date: Oct. 5, 2023

(65) Prior Publication Data
US 2025/0033324 A1      Jan. 30, 2025

(30) Foreign Application Priority Data

Mar. 30, 2022      (EP) ..................................... 22165378

(51) Int. Cl.
B32B 15/04          (2006.01)
B32B 7/023          (2019.01)
(Continued)

(52) U.S. Cl.
CPC ........ B32B 17/10036 (2013.01); B32B 7/023 (2019.01); B32B 7/12 (2013.01);
(Continued)

(58) Field of Classification Search
CPC ...................... B32B 17/10036; B32B 2307/42
(Continued)

(56) References Cited

U.S. PATENT DOCUMENTS 5,882,774 A       3/1999   Jonza et al.
2004/0135742 A1*  7/2004   Weber ............... B32B 17/10036
                                                   345/7
(Continued)

FOREIGN PATENT DOCUMENTS

DE      10 2014 220189 A1      4/2016
WO      WO 96/19347 A2      6/1996
(Continued)

OTHER PUBLICATIONS

Internatinoal Search Report as issued in International Patent Application No. PCT/EP2023/057259, dated Mar. 31, 2023.

*Primary Examiner* — Lauren R Colgan
(74) *Attorney, Agent, or Firm* — CUSHMAN PARTNERS, LLC

(57)          ABSTRACT

A laminated pane having a projection region and a main see-through region, includes an outer pane, at least one thermoplastic intermediate layer, a reflective layer, an opaque masking layer, an inner pane, an adhesive layer, and a λ/4 retardation plate, wherein the at least one thermoplastic intermediate layer is arranged between the outer pane and the inner pane, the projection region is arranged outside the main see-through region, the reflective layer is arranged at least in the projection region between the outer pane and the inner pane, the opaque masking layer is arranged at least in the projection region between the outer pane and the inner pane and, when viewed through the laminated pane, is arranged spatially behind the reflective layer, starting from the interior-side surface of the inner pane, and the λ/4
(Continued)

Figure 1:
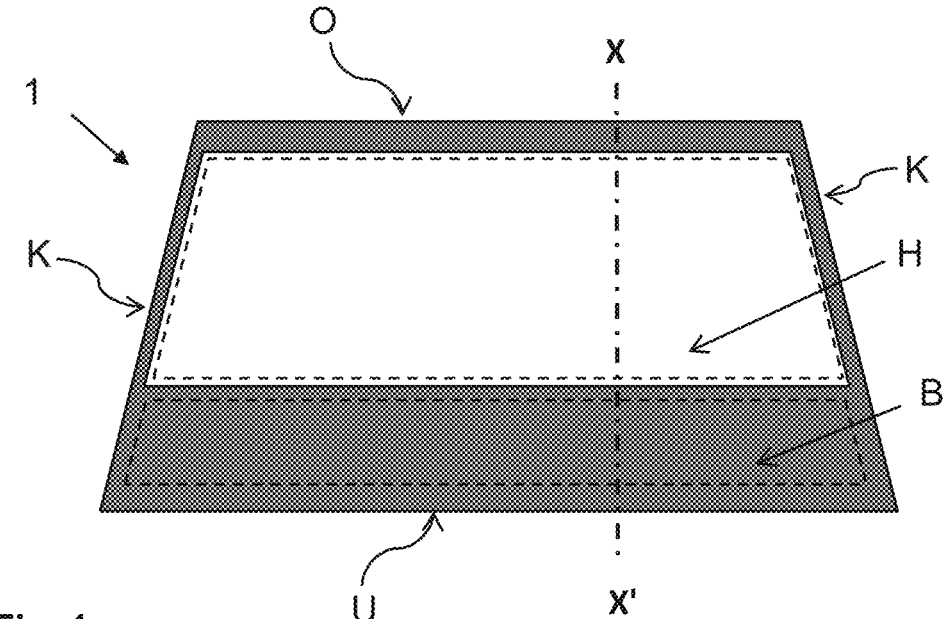

retardation plate is connected via the adhesive layer to the interior-side surface of the inner pane.

20 Claims, 9 Drawing Sheets

(51) Int. Cl.
*B32B 7/12* (2006.01)
*B32B 17/06* (2006.01)
*B32B 17/10* (2006.01)

(52) U.S. Cl.
CPC .. *B32B 17/10183* (2013.01); *B32B 17/10779* (2013.01); *B32B 2255/205* (2013.01); *B32B 2307/204* (2013.01); *B32B 2307/412* (2013.01); *B32B 2457/20* (2013.01); *B32B 2605/08* (2013.01)

(58) Field of Classification Search
USPC ................................................. 428/426, 432
See application file for complete search history.

(56) References Cited

U.S. PATENT DOCUMENTS

| | | | | |
|---|---|---|---|---|
| 2018/0337219 A1* | 11/2018 | Rhee | ...................... | H10K 59/50 |
| 2022/0373809 A1* | 11/2022 | Sato | ......................... | G02B 5/18 |

FOREIGN PATENT DOCUMENTS

| | | | |
|---|---|---|---|
| WO | WO 2021/104800 A1 | 6/2021 |
| WO | WO 2021/228621 A1 | 11/2021 |
| WO | WO 2021/228624 A1 | 11/2021 |
| WO | WO 2021/228625 A1 | 11/2021 |
| WO | WO 2022/073860 A1 | 4/2022 |
| WO | WO 2022/073894 A1 | 4/2022 |
| WO | WO 2022/101194 A1 | 5/2022 |
| WO | WO 2022/161894 A1 | 8/2022 |
| WO | WO 2022/179817 A1 | 9/2022 |
| WO | WO 2022/214369 A1 | 10/2022 |
| WO | WO 2022/218699 A1 | 10/2022 |
| WO | WO 2022/228946 A1 | 11/2022 |
| WO | WO 2023/025547 A1 | 3/2023 |
| WO | WO 2023/052065 A1 | 4/2023 |

* cited by examiner

1

LAMINATED PANE WITH RETARDATION PLATE

CROSS-REFERENCE TO RELATED APPLICATIONS

This application is the U.S. National Stage of PCT/EP2023/057259, filed Mar. 22, 2023, which in turn claims priority to European patent application number 22165378.5 filed Mar. 30, 2022. The content of these applications are incorporated herein by reference in their entirety.

The invention relates to a laminated pane with a λ/4 retardation plate, a projection arrangement and the use of the laminated pane.

In order to display navigation information in windshields, projection arrangements known under the term of head-up displays (HUD) consisting of an image display device and windshield with a wedge-angle thermoplastic intermediate layer and/or with wedge-angle panes are often used. A wedge angle is necessary to avoid double images. The projected image appears in the form of a virtual image at a certain distance from the windshield so that the driver of the motor vehicle sees, for example, the projected navigation information as being in front of him on the road. Typically, the radiation from HUD image display devices is substantially s-polarized due to the better reflection characteristics of the windshield compared to p-polarization. However, if the viewer wears polarization-selective sun glasses which do not transmit any s-polarized light, he will perceive the HUD image dimmer at best. A solution to this problem is the use of projection arrangements that employ p-polarized light.

DE102014220189A1 discloses a head-up display projection arrangement which is operated with p-polarized radiation, wherein the windshield has a reflective structure which reflects p-polarized radiation in the direction of the viewer. US20040135742A1 also discloses a head-up display projection arrangement using p-polarized radiation which has a reflective structure. WO 96/19347A3 proposes a multi-layer polymer layer as a reflective structure.

When designing a display which is based on the head-up display technology, it must also be ensured that the image display device has a correspondingly strong power so that the projected image has sufficient brightness and can be easily seen by the viewer, in particular when sunlight is incident. This requires a certain size of the image display device and is associated with a corresponding power consumption.

Accordingly, there is a need for improved laminated panes for projection arrangements with which these disadvantages can be avoided. There is therefore a need for improved laminated panes for projection arrangements in which the projection arrangements have a strong contrast of the generated image, even with oncoming light, and a low energy consumption, and in which projected images for a viewer who is wearing polarization-selective sunglasses can be easily perceived. The object of the present invention is to provide such an improved laminated pane, a method for the production thereof and a use thereof, and to provide an improved projection arrangement with an improved laminated pane.

This object is achieved according to the invention by a laminated pane according to claim 1, a projection arrangement, and a use according to the independent claims. Preferred embodiments result from the dependent claims.

The laminated pane according to the invention comprises an outer pane, at least one thermoplastic intermediate layer, a reflective layer, an opaque masking layer, an inner pane, an adhesive layer, and a λ/4 retardation plate.

The laminated pane has a main see-through region and a projection region.

The laminated pane is provided to separate the interior from the external environment in a window opening of a vehicle. Within the meaning of the invention, the term "inner pane" refers to the pane of the laminated pane facing the vehicle interior. Outer pane means the pane facing the external environment.

The laminated pane has an upper edge and a lower edge and two side edges extending between them. Upper edge means the edge intended to point upward in the installed position. Lower edge means the edge intended to point downward in the installed position. In the case of a windshield, the upper edge is often also referred to as the roof edge and the lower edge is referred to as the motor edge.

The outer pane and the inner pane each have an exterior-side and an interior-side surface and a peripheral side edge extending between them. In the context of the invention, the exterior-side surface means the main surface which is provided to face the external environment when installed. In the context of the invention, the interior-side surface means the main surface that is provided to face the interior in the installation position. The interior-side surface of the outer pane and the exterior-side surface of the inner pane face one another and are connected to one another by the at least one thermoplastic intermediate layer. The exterior-side surface of the outer pane therefore faces away from the at least one thermoplastic intermediate layer, and the interior-side surface of the outer pane faces the at least one thermoplastic intermediate layer. The exterior-side surface of the inner pane faces the at least one thermoplastic intermediate layer, and the interior-side surface of the inner pane faces away from the at least one thermoplastic intermediate layer.

The exterior-side surface of the outer pane is designated as side I. The interior-side surface of the outer pane is designated as side II. The exterior-side surface of the inner pane is designated as side III. The interior-side surface of the inner pane is designated as side IV.

According to the invention, the projection region is arranged outside the main see-through region. This means that the projection region and the main see-through region do not overlap with one another. In a preferred embodiment, the main see-through region and the projection region are arranged at a distance from one another, i.e. the main see-through region and the projection region are not arranged adjacent to one another in this embodiment. In another embodiment, the projection region and the main see-through region are arranged adjacent to one another, i.e. in this embodiment, the main see-through region and the projection region are arranged directly adjacent to one another.

The reflective layer is suitable for reflecting light. The reflective layer is therefore a light-reflecting layer. The reflective layer is suitable, for example, for reflecting p-polarized light and/or for reflecting circularly polarized light. It can therefore be designed as a layer reflecting p-polarizing light and/or as a layer reflecting circularly polarizing light. According to the invention, the reflective layer is arranged between the outer pane and the inner pane and at least in the projection region.

The reflective layer preferably reflects at least 5%, particularly preferably at least 10% of the light striking the reflective layer in a wavelength range of 450 nm to 650 nm and at angles of incidence of 55° to 75°. Particularly preferably, the reflective layer reflects 30% or more, particularly preferably 50% or more, very particularly 70% or more, and in particular 90% or more of the light striking the reflective layer.

The opaque masking layer is arranged at least in the projection region between the outer pane and the inner pane and, when viewed through the laminated pane, is arranged spatially behind the reflective layer starting from the interior-side surface of the inner pane. Accordingly, the reflective layer has a smaller distance to the vehicle interior than the opaque masking layer when the laminated pane according to the invention is in an installed state in a vehicle.

It goes without saying that the opaque masking layer is arranged outside the main see-through region of the laminated pane. Due to the arrangement of the opaque masking layer outside the main see-through region, the transparency of the laminated pane in the main see-through region is not influenced by the opaque masking layer.

The λ/4 retardation plate is connected via the adhesive layer to the interior-side surface of the inner pane. When viewed perpendicularly through the laminated pane, the λ/4 retardation plate is arranged in a region of the laminated pane which lies completely in the region in which the opaque masking layer is arranged.

According to the invention, when viewed perpendicular through the laminated pane, the projection region lies completely in the region of the laminated pane in which the λ/4 retardation plate is arranged. The projection region is therefore arranged in a perpendicular view through the laminated pane or in an orthogonal projection through the laminated pane so as to cover or overlap with the λ/4 retardation plate. The projection region therefore does not have a section which is not overlapping with the λ/4 retardation plate.

Due to the fact that the opaque masking layer is arranged at least in the projection region, the projection region is arranged in a perpendicular view through the laminated pane or in an orthogonal projection through the laminated pane so as to cover or overlap with the opaque masking layer.

In a preferred embodiment of the laminated pane according to the invention, the reflective layer is arranged substantially over the entire surface between the outer pane and the inner pane. An arrangement of the reflective layer substantially over the entire surface is understood to mean an arrangement over the entire surface, or an arrangement over the entire surface minus a peripheral edge region having a width of, for example, 5 mm to 50 mm. The width of the peripheral edge region can be constant or can vary.

In another preferred embodiment, the reflective layer is arranged between the outer pane and the inner pane in a region which, when viewed perpendicularly through the laminated pane, lies completely in the region in which the opaque masking layer is arranged.

As described above, the reflective layer is arranged between the outer pane and the inner pane. In a preferred embodiment, the reflective layer is arranged between the inner pane and the at least one thermoplastic intermediate layer. In another preferred embodiment, the reflective layer is arranged between the outer pane and the at least one thermoplastic intermediate layer. In embodiments in which the laminated pane has at least two thermoplastic intermediate layers, the reflective layer can be arranged between the inner pane and the at least two thermoplastic intermediate layers, or between the outer pane and the at least two thermoplastic intermediate layers, or in particular between two of the at least two thermoplastic intermediate layers.

The adhesive layer is preferably a thermoplastic polymer layer or an optical clear adhesive (OCA).

Suitable optical clear adhesives (OCA) are known to a person skilled in the art.

An adhesive layer formed as a thermoplastic polymer layer comprises at least one thermoplastic polymer, preferably ethylene vinyl acetate (EVA), polyvinyl butyral (PVB) or polyurethane (PU), or mixtures, or copolymers, or derivatives thereof, particularly preferably PVB. The thermoplastic polymer layer is typically formed from a thermoplastic film (joining film). The thickness of the thermoplastic polymer layer is preferably from 0.2 mm to 2 mm, particularly preferably from 0.3 mm to 1 mm, for example 760 μm (micrometers). The thermoplastic polymer layer may be formed by a single film or also by more than one film.

The opaque masking layer is preferably a peripheral, i.e. frame-like, masking layer which is therefore arranged in a peripheral edge region. A peripheral, opaque masking layer also serves as UV protection for the construction adhesive of the laminated pane.

Particularly preferred are embodiments in which the projection region is arranged adjacent to the lower edge of the laminated pane. The projection region can be arranged either directly adjacent or indirectly adjacent to the lower edge. Indirectly adjacent is to be understood as meaning that the projection region is not directly adjacent to the lower edge, but is arranged at a distance therefrom, for example, a few centimeters, for example 1 cm to 10 cm, preferably 1 cm to 5 cm.

Due to the fact that the projection region lies completely in the region of the laminated pane in which the λ/4 retardation plate is arranged when viewed perpendicularly through the laminated pane, and the λ/4 retardation plate is arranged in a region of the laminated pane which, when viewed perpendicularly through the laminated pane, lies completely in the region in which the opaque masking layer is arranged, the opaque masking layer is consequently also preferably arranged at least in a region adjacent to the lower edge of the laminated pane.

In a preferred embodiment of a laminated pane according to the invention, the opaque masking layer is arranged at least partially in a peripheral edge region and, in particular in a section which overlaps with the projection region, has a greater width than in sections different therefrom.

The opaque masking layer within the meaning of the invention is a layer that prevents the view through the laminated pane. A transmission of at most 10%, preferably at most 5%, particularly preferably at most 2%, very particularly preferably at most 1%, in particular at most 0.1%, of the light of the visible spectrum through the opaque masking layer takes place. The opaque masking layer is preferably black.

The opaque masking layer is preferably a coating made up of one or more layers. Alternatively, however, it may also be an opaque element, e.g., a film, embedded in the laminated pane. According to a preferred embodiment of the laminated pane, the opaque masking layer consists of a single layer. This has the advantage of a particularly simple and cost-effective manufacture of the laminated pane because only a single layer has to be formed for the opaque masking layer.

The opaque masking layer is in particular an opaque cover print made of a dark, preferably black, enamel.

An opaque masking layer designed as an opaque cover print can be over the entire surface. The cover print can also be designed to be semi-transparent at least in sections, for example as a dot matrix, stripe matrix, or checkered matrix. Alternatively, the cover print can also have a gradient, for example from an opaque coverage to a semi-transparent coverage. Preferably, the masking layer, which is designed as an opaque cover print, is designed to be over the entire surface at least in the projection region.

In a preferred embodiment, the opaque masking layer is designed as an opaque cover print on the interior-side surface of the outer pane.

In one embodiment, the opaque masking layer is designed as an opaquely colored region of the at least one thermoplastic intermediate layer.

In one embodiment, the laminated pane has a thermoplastic intermediate layer which is formed in one piece and is opaquely colored in a region. In another embodiment, the laminated pane has at least two thermoplastic intermediate layers, and one of these is formed in one piece and is colored opaque in a region.

An opaque masking layer formed as an opaquely colored region of a thermoplastic intermediate layer can also be realized by using a thermoplastic intermediate layer composed of an opaque thermoplastic film and a transparent thermoplastic film. The opaque thermoplastic film and the transparent thermoplastic film are preferably arranged offset from one another, so that the two films are not overlapping when looking through the laminated pane. The transparent and the opaque film consist of the same plastics or preferably contain the same plastics. The materials on the basis of which the opaque film and the transparent film can be formed are those which are also described for the at least one first thermoplastic intermediate layer. The opaque film is preferably a colored film which can have different colors, in particular black.

From the perspective of a vehicle occupant, the reflective layer is arranged spatially at least in some regions in front of the opaque masking layer when viewed through the inner pane. The region of the laminated pane in which the reflective layer is arranged spatially in front of the opaque masking layer therefore appears opaque. The reflective layer is preferably transparent in the region in front of the opaque masking layer, but can also itself be opaque. The expression "when looking through the laminated pane" means looking through the laminated pane starting from the interior-side surface of the inner pane. The expression "spatially in front of," as used in the present invention, means that the reflective layer is arranged spatially further away from the exterior-side surface of the outer pane than the opaque masking layer.

The laminated pane according to the invention can optionally have an additional opaque cover print on the interior-side surface of the outer pane, on the exterior-side surface of the inner pane, or on the interior-side surface of the inner pane with the proviso that this additional opaque cover print is arranged in a region outside the main see-through region and outside the projection region.

The reflective layer is preferably designed as a reflective coating or as a reflective film.

In a preferred embodiment, the reflective layer is designed as a reflective coating of the exterior-side surface of the inner pane.

In another preferred embodiment, the reflective layer is designed as a reflective coating of the interior-side surface of the outer pane, with the proviso that the opaque masking layer is arranged spatially behind the reflective layer in the view through the laminated pane starting from the interior-side surface of the inner pane.

The reflective layer can also be designed as a reflective coating of the thermoplastic intermediate layer.

The reflective layer preferably comprises at least one metal selected from a group consisting of aluminum, tin, titanium, copper, chromium, cobalt, iron, manganese, zirconium, cerium, yttrium, silver, gold, platinum, and palladium, or mixtures thereof.

In a preferred embodiment of the invention, the reflective layer is a reflective coating containing a thin-film stack, i.e., a layer sequence of thin individual layers. This thin-film stack contains one or more electrically conductive layers on the basis of silver. The electrically conductive layer on the basis of silver gives the reflective coating the basic reflective properties and also an IR-reflecting effect and electrical conductivity. The electrically conductive layer is formed on the basis of silver. The conductive layer preferably contains at least 90% by weight of silver, particularly preferably at least 99% by weight of silver, and very particularly preferably at least 99.9% by weight of silver. The silver layer can have dopants, e.g., palladium, gold, copper, or aluminum. Materials based on silver are particularly suitable for reflecting p-polarized light. The coating has a thickness of 5 μm to 50 μm and preferably of 8 μm to 25 μm.

The reflective layer can also be designed as a reflective coated or uncoated film. The reflective layer can be a carrier film with a reflective coating or an uncoated, reflective polymer film. The reflective coating preferably comprises at least one layer on the basis of a metal and/or a dielectric layer sequence with alternating refractive indices. The layer on the basis of a metal preferably contains or consists of silver and/or aluminum. The dielectric layers can be formed, for example, on the basis of silicon nitride, zinc oxide, tin-zinc oxide, silicon-metal mixed nitrides such as silicon-zirconium nitride, zirconium oxide, niobium oxide, hafnium oxide, tantalum oxide, tungsten oxide, or silicon carbide. The oxides and nitrides mentioned can be deposited stoichiometrically, substoichiometrically, or hyperstoichiometrically. They can have dopings, e.g., aluminum, zirconium, titanium, or boron. The reflective, uncoated polymer film preferably comprises or consists of dielectric polymer layers. The dielectric polymer layers preferably contain polyethylene terephthalate (PET). If the reflective layer is designed as a reflective film, it is preferably from 30 μm to 300 μm, particularly preferably from 50 μm to 200 μm, and in particular from 100 μm to 150 μm, thick.

If the reflective layer is designed as a reflective coating, it is preferably applied to the interior-side surface of the outer pane or to the exterior-side surface of the inner pane by physical vapor deposition (PVD), particularly preferably by sputtering and very particularly preferably by magnetron sputtering. In principle, however, the coating can also be applied, for example, by means of chemical vapor deposition (CVD), plasma-enhanced chemical vapor deposition (PECVD), by vapor deposition, or by atomic layer deposition (ALD).

If the film is a coated, reflective film, the coating methods of CVD or PVD can likewise be used for the production.

According to another preferred embodiment of the laminated pane according to the invention, the reflective layer is designed as a reflective coated carrier film or uncoated polymer film, and is preferably arranged between two thermoplastic intermediate layers. The advantage of this arrangement is that the reflective layer does not have to be applied to the outer pane or inner pane by means of thin film technology (e.g., CVD and PVD). This results in uses of the reflective layer with further advantageous functions, such as a more homogeneous reflection of the light on the reflective layer.

The reflective layer can be designed as a polyethylene terephthalate (PET)-based film which is coated with a copolymer layer stack based on PET and/or polyethylene naphthalate (PEN). The coating is preferably applied to the interior-side surface, i.e., the surface that faces the vehicle interior. Such films are particularly suitable for reflecting p-polarized light. Suitable reflective films are described, for example, in U.S. Pat. No. 5,882,774 A.

As described above, in a preferred embodiment, the reflective layer has at least one electrically conductive layer based on silver. The conductive layer preferably contains at least 90% by weight of silver, particularly preferably at least 99% by weight of silver, and very particularly preferably at least 99.9% by weight of silver. The silver layer can have dopants, e.g., palladium, gold, copper, or aluminum. The thickness of the silver layer is usually between 5 nm and 20 nm.

Dielectric layers or layer sequences are typically arranged above and below the electrically conductive layer. If the reflective coating comprises a plurality of conductive layers, each conductive layer is preferably arranged in each case between two typically dielectric layers or layer sequences, so that a dielectric layer or layer sequence is arranged in each case between adjacent conductive layers. The reflective layer is therefore preferably a thin-film stack with n electrically conductive layers and (n+1) dielectric layers or layer sequences, wherein n is a natural number, and wherein a conductive layer and a dielectric layer or layer sequence always alternatingly follows a lower dielectric layer or layer sequence. Such reflective layers are known as sun protection coatings and heatable coatings. Due to the at least one electrically conductive coating, the reflective layer has IR-reflecting properties, so that it functions as a sun protection coating, which reduces the heating of the vehicle interior by reflection of the thermal radiation. The reflective layer can also be used as a heating coating when it is electrically contacted, so that a current flows through it, which heats the reflective layer.

Common dielectric layers of such a thin-film stack are, for example:

anti-reflective layers, which reduce the reflection of visible light and thus increase the transparency of the coated pane, for example based on silicon nitride, silicon-metal mixed nitrides such as silicon zirconium nitride, titanium oxide, aluminum nitride or tin oxide, with layer thicknesses of, for example, 10 nm to 100 nm;

adjustment layers, which improve the crystallinity of the electrically conductive layer, for example based on zinc oxide (ZnO), with layer thicknesses of, for example, 3 nm to 20 nm;

smoothing layers, which improve the surface structure for the layers above, for example based on a non-crystalline oxide of tin, silicon, titanium, zirconium, hafnium, zinc, gallium and/or indium, in particular based on tin-zinc mixed oxide (ZnSnO), with layer thicknesses of, for example, 3 nm to 20 nm.

Due to the at least one electrically conductive layer, such a reflective layer has reflective properties in the visible spectral range which always occur to a certain extent also with respect to p-polarized radiation. By suitably selecting the layer thicknesses, in particular the dielectric layer sequence, the reflection with respect to p-polarized radiation can, for example, be optimized in a targeted manner.

In addition to the electrically conductive layers and dielectric layers, the reflective layer can also comprise blocker layers, which protect the conductive layers from degeneration. Blocker layers are typically very thin metal-containing layers based on niobium, titanium, nickel, chromium, and/or alloys with layer thicknesses of, for example, 0.1 nm to 2 nm.

In a particularly preferred embodiment, the reflective layer has exactly one electrically conductive layer based on silver.

In a very particularly preferred embodiment, the reflective layer has exactly one electrically conductive layer based on silver, and below the electrically conductive layer, a lower dielectric layer or layer sequence is arranged whose refractive index is at least 1.9, and above the electrically conductive layer, an upper dielectric layer or layer sequence is arranged whose refractive index is at least 1.9, and the ratio of the optical thickness of the upper dielectric layer or layer sequence to the optical thickness of the lower dielectric layer or layer sequence is at least 1.7. The reflective layer can therefore be constructed, for example, as described in WO 2021/104800 A1.

In the context of the present invention, refractive indices are in all cases specified in relation to a wavelength of 550 nm. Methods for determining refractive indices are known to the person skilled in the art. The refractive indices specified within the scope of the invention can be determined, for example, by ellipsometry, wherein commercially available ellipsometers can be used. Unless otherwise indicated, the specification of layer thicknesses or thicknesses refers to the geometric thickness of a layer.

If a first layer is arranged above a second layer, this means, within the meaning of the invention, that the first layer is arranged further away from the substrate on which the coating is applied than the second layer. If a first layer is arranged below a second layer, this means, within the meaning of the invention, that the second layer is arranged further away from the substrate than the first layer.

If a layer is formed "on the basis of" a material, the layer consists predominantly of this material, in particular substantially of this material, in addition to any impurities or doping. The mentioned oxides and nitrides can be deposited stoichiometrically, hypostoichiometrically or hyperstoichiometrically (even if a stoichiometric total formula is indicated for better understanding). They can have dopings, e.g., aluminum, zirconium, titanium, or boron.

The laminated pane can additionally comprise a coating which is designed as a protective coating or an anti-reflection coating and is arranged on the surface of the λ/4 retardation plate facing away from the adhesive layer.

Suitable protective coatings or anti-reflection coatings are known to a person skilled in the art.

The outer pane and the inner pane are preferably made of glass, in particular of soda-lime glass, which is customary for window panes. In principle, however, the panes can also be produced from other types of glass (for example borosilicate glass, quartz glass, aluminosilicate glass) or transparent plastics (for example polymethyl methacrylate or polycarbonate). The thickness of the outer pane and the inner pane can vary widely. Preferably, panes having a thickness in the range from 0.8 mm to 5 mm, preferably from 1.4 mm to 2.5 mm, are used, for example those with the standard thicknesses of 1.6 mm or 2.1 mm.

In a preferred embodiment, the inner pane has a thickness of at most 1.6, mm, particularly preferably of at most 1.4 mm, very particularly preferably of at most 1.1 mm.

The outer pane, the inner pane and the at least one thermoplastic intermediate layer can be clear and colorless, but also tinted or colored. In a preferred embodiment, the total transmittance through the windshield (including reflective coating) is greater than 70% in the main see-through region (light type A). The term total transmittance relates to the method defined by ECE-R 43, Annex 3, § 9.1 for testing the light transmittance of motor vehicle panes. Independently of one another, the outer pane and the inner panes can be not prestressed, partially prestressed or prestressed. If at least one of the panes should be prestressed, this can be thermal or chemical prestressing.

The inner pane is preferably not colored or tinted.

The laminated pane is preferably curved in one or more spatial directions, as is usual for motor vehicle panes, wherein the typical radii of curvature are in a range of approximately 10 cm to approximately 40 m. However, the laminated pane can also be flat, for example if it is provided as a pane for buses, trains or tractors.

The at least thermoplastic intermediate layer comprises at least one thermoplastic polymer, preferably ethylene vinyl acetate (EVA), polyvinyl butyral (PVB) or polyurethane (PU), or mixtures, or copolymers, or derivatives thereof, particularly preferably PVB. The thickness of the intermediate layer is preferably from 0.2 mm to 2 mm, particularly preferably from 0.3 mm to 1 mm. The at least one thermoplastic intermediate layer can also be a film with functional properties, for example a film with acoustic damping properties. Preferably, the at least one thermoplastic intermediate layer is of constant thickness, apart from any surface roughness customary in the art, i.e., it does not have a wedge-shaped cross section.

Retardation plates, also called retardation layers or wave plates, are optical elements which generate a phase shift of the transmitted light. The desired delay is achieved by varying the thickness and the alignment of the retardation plate in the beam path. A phase shift of 90° refers to a $\lambda/4$-plate, quarter-wave plate or also a circular polarizer.

Suitable $\lambda/4$ retardation plates are known to a person skilled in the art.

$\lambda/4$ retardation plates consist of birefringent materials. Birefringent materials have refractive indices for light that deviate slightly from one another.

In a preferred embodiment, the $\lambda/4$ retardation plate is designed as a polymeric retardation plate. $\lambda/4$ retardation plates are commercially available in the form of birefringent plastics films. Polymeric components adapt very well to any three-dimensional bending of the pane and can be integrated into the laminated pane in a simple manner.

In another preferred embodiment, the $\lambda/4$ retardation plate is designed as a retardation plate made of crystalline quartz or sapphire.

$\lambda/4$ retardation plates are used to obtain circularly polarized light from linearly polarized light and vice versa. The polarization of the incident beam must be 45° relative to the optical axis of the plate. $\lambda/4$ retardation plates have a design wavelength of approximately 560 nm.

A laminated pane according to the invention can be produced according to a method at least comprising:

a) providing a laminate with a projection region, a main see-through region, an upper edge, a lower edge, and two lateral pane edges, comprising an outer pane with an exterior-side surface and an interior-side surface, at least one thermoplastic intermediate layer, a reflective layer, an opaque masking layer, and an inner pane with an exterior-side surface and an interior-side surface, wherein the outer pane has an exterior-side surface facing away from the at least one thermoplastic intermediate layer, and an interior-side surface facing the at least one thermoplastic intermediate layer, and the inner pane has an exterior-side surface facing the at least one thermoplastic intermediate layer and an interior-side surface facing away from the at least one thermoplastic intermediate layer, the projection region is arranged outside the main see-through region, the reflective layer is arranged at least in the projection region between the outer pane and the inner pane, the opaque masking layer is arranged at least in the projection region between the outer pane and the inner pane, and is arranged, when view through the laminated pane, spatially behind the reflective layer viewed from the interior-side surface of the inner pane;

b) providing a $\lambda/4$ retardation plate and an adhesive layer;

c) connecting the $\lambda/4$ retardation plate to the interior-side surface of the inner pane of the laminate via the adhesive layer to a laminated pane having a projection region, a main see-through region, an upper edge, a lower edge, and two lateral pane edges, such that the $\lambda/4$ retardation plate is arranged in a region of the laminated pane which, when viewed perpendicularly through the laminated pane, lies completely in the region in which the opaque masking layer is arranged, and the projection region lies completely in the region in which the $\lambda/4$ retardation plate is arranged when viewed perpendicular through the laminated pane.

A laminated pane according to the invention can also be produced according to a method at least comprising:

a) providing a stack sequence with a projection region, a main see-through region, an upper edge, a lower edge, and two lateral pane edges, comprising an outer pane with an exterior-side surface and an interior-side surface, at least one thermoplastic intermediate layer, a reflective layer, an opaque masking layer, an inner pane with an exterior-side surface and an interior-side surface, an adhesive layer, and a $\lambda/4$ retardation plate, wherein the outer pane has an exterior-side surface facing away from the at least one thermoplastic intermediate layer, and an interior-side surface facing the at least one thermoplastic intermediate layer, and the inner pane has an exterior-side surface facing the at least one thermoplastic intermediate layer and an interior-side surface facing away from the at least one thermoplastic intermediate layer, the projection region is arranged outside the main see-through region, the reflective layer is arranged at least in the projection region between the outer pane and the inner pane, the opaque masking layer is arranged at least in the projection region between the outer pane and the inner pane, and, when viewed through the laminated pane, is arranged spatially behind the reflective layer starting from the interior-side surface of the inner pane; the $\lambda/4$ retardation plate is arranged in a region of the stacking sequence which, when viewed perpendicularly through the stacking sequence, lies completely in the region in which the opaque masking layer is arranged, the adhesive layer is arranged between the $\lambda/4$ retardation plate and the interior-side surface of the inner pane and is designed as a thermoplastic polymer layer, and the projection region, when viewed perpendicularly through the stacking sequence, lies completely in the region of the stacking sequence in which the $\lambda/4$ retardation plate is arranged;

b) connecting the stack sequence to a laminated pane having a projection region, a main see-through region, an upper edge, a lower edge, and two lateral pane edges by lamination.

The invention also relates to a projection arrangement comprising a laminated pane according to the invention and an image display device which is directed onto the projection region of the laminated pane. The image display device is arranged in such a way that the interior-side surface of the inner pane is the surface of the inner pane closest to the image display device.

The invention therefore also relates to a projection arrangement comprising:

a laminated pane having a projection region, a main see-through region, an upper edge, a lower edge, and two lateral pane edges, at least comprising an outer pane, at least one thermoplastic intermediate layer, a reflective layer, an opaque masking layer, an inner pane, an adhesive layer, and a λ/4 retardation plate, wherein the outer pane has an exterior-side surface facing away from the at least one thermoplastic intermediate layer, and an interior-side surface facing the at least one thermoplastic intermediate layer, and the inner pane has an exterior-side surface facing the at least one thermoplastic intermediate layer, and an interior-side surface facing away from the at least one thermoplastic intermediate layer, the projection region is arranged outside the main see-through region, the reflective layer is arranged at least in the projection region between the outer pane and the inner pane, the opaque masking layer is arranged at least in the projection region between the outer pane and the inner pane and, when viewed through the laminated pane, is arranged spatially behind the reflective layer starting from the interior-side surface of the inner pane, the λ/4 retardation plate is connected via the adhesive layer to the interior-side surface of the inner pane and is arranged in a region of the laminated pane which, when viewed perpendicularly through the laminated pane, lies completely in the region in which the opaque masking layer is arranged, and when viewed perpendicularly through the laminated pane, the projection region lies completely in the region of the laminated pane in which the λ/4 retardation plate is arranged and an image display device which is directed toward the projection region and is arranged in such a way that the interior-side surface of the inner pane is the surface of the inner pane closest to the image display device.

In a preferred embodiment of the projection arrangement according to the invention, the image display device emits s-polarized light. Said light first strikes the λ/4 retardation plate and is converted thereby into circularly polarized light and strikes the reflective layer. The circularly polarized light is reflected by the reflective layer, wherein the direction of rotation changes. Before the reflected circularly polarized light leaves the laminated pane, it passes again through the λ/4 retardation plate and is converted into p-polarized light. The p-polarized light is also very perceivable by a viewer who wears polarization-selective sun glasses. This is an advantage of the projection arrangement according to the invention that, when an image display device emitting s-polarizing light is used, p-polarized light reaches the observer.

In another preferred embodiment of the projection arrangement according to the invention, the image display device emits circularly polarized light. Said light first strikes the λ/4 retardation plate and is converted thereby into p-polarized light and strikes the reflective layer. The p-polarized light is reflected by the reflective layer. Before the reflected p-polarized light leaves the laminated pane, it passes again through the λ/4 retardation plate and is converted into circularly polarized light. The circularly polarized light is also very perceivable by a viewer who wears polarization-selective sun glasses.

The preferred embodiments of the laminated pane according to the invention described above also correspondingly apply for the projection arrangement according to the invention comprising a laminated pane according to the invention and an image display device and vice versa.

The term "p-polarized light" means light of the visible spectrum that has p-polarization. The polarization direction is viewed in relation to the plane of incidence of the radiation on the laminated pane. P-polarized radiation refers to a radiation the electric field of which oscillates in the plane of incidence. S-polarized radiation refers to a radiation the electric field of which oscillates perpendicular to the plane of incidence. The plane of incidence is spanned by the incident vector and the surface normal of the laminated pane in the geometric center of the irradiated region. In other words, the polarization, i.e., in particular, the proportion of p-polarized and s-polarized radiation, is determined at a point of the region irradiated by the light source—preferably in the geometric center of the irradiated region. Since laminated panes can be curved (for example, when configured as a windshield), which has effects upon the plane of incidence of the radiation, polarization components slightly deviating therefrom can occur in the other regions, which is unavoidable for physical reasons.

In the context of this application, the projection region denotes that region which, when the laminated pane is used in a projection arrangement comprising the laminated pane and an image display device, can be irradiated by the image display device. This region encloses the region of the laminated pane with which the light reflected by the reflective layer is reflected to the observer. The region through which a vehicle driver or viewer sees mainly through the laminated pane is referred to as the main see-through region within the scope of this application.

Within the meaning of the present invention, "transparent" means that the total transmittance of the laminated pane corresponds to the legal provisions for windshields and preferably has a permeability of more than 50%, in particular more than 60%, for example more than 70% for visible light. Accordingly, "opaque" means a light transmission of less than 10%, preferably less than 5%, and in particular 0%.

According to a preferred embodiment of the projection arrangement according to the invention, the image display device, which can for example be a projector or preferably a display, can be designed as a liquid-crystal (LCD) display, thin-film transistor (TFT) display, light-emitting diode (LED) display, organic light-emitting diode (OLED) display, electroluminescent (EL) display, microLED display or the like, preferably as an LCD display. Energy-intensive projectors such as are usually used in head-up display applications are not absolutely necessary. The aforementioned display variants and other similarly energy-saving display devices are sufficient. This has the consequence that the energy consumption can be reduced.

Preferably, the radiation of the image display device strikes the laminated pane with an angle of incidence of 55° to 80°, particularly preferably of 62° to 77°.

Also according to the invention is the use of a laminated pane according to the invention as a vehicle pane in a means of transport for traffic on land, in the air or on water, in particular in motor vehicles and in particular as a windshield for a head-up display.

Figure 2:
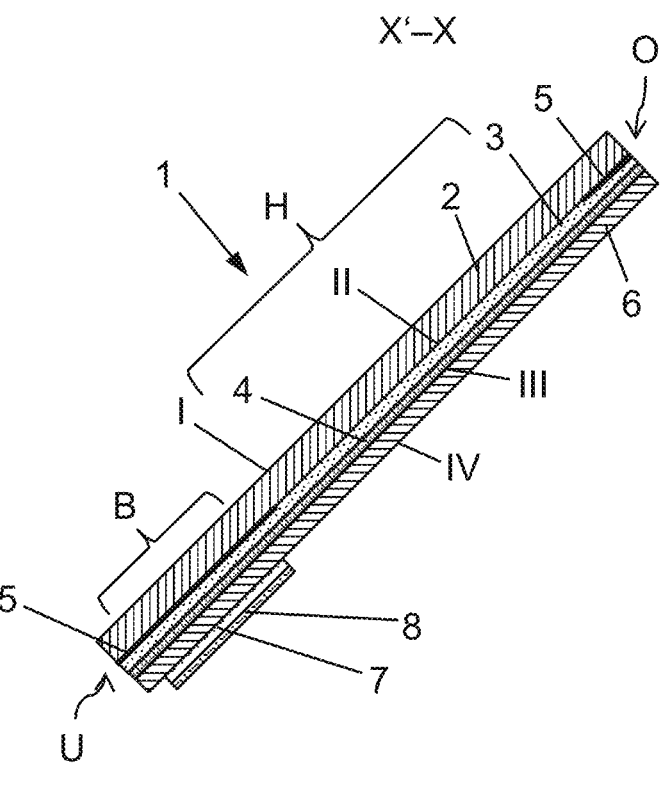
Figure 3:
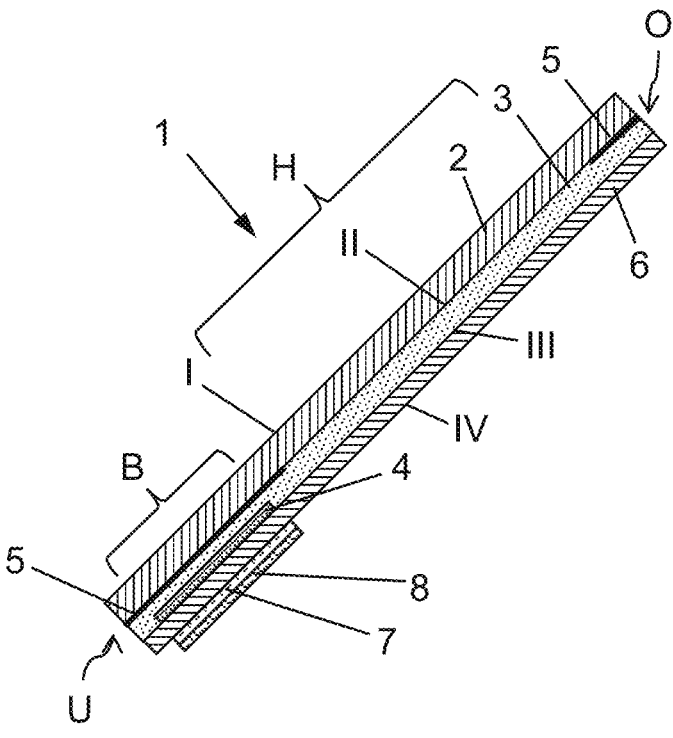
Figure 4:
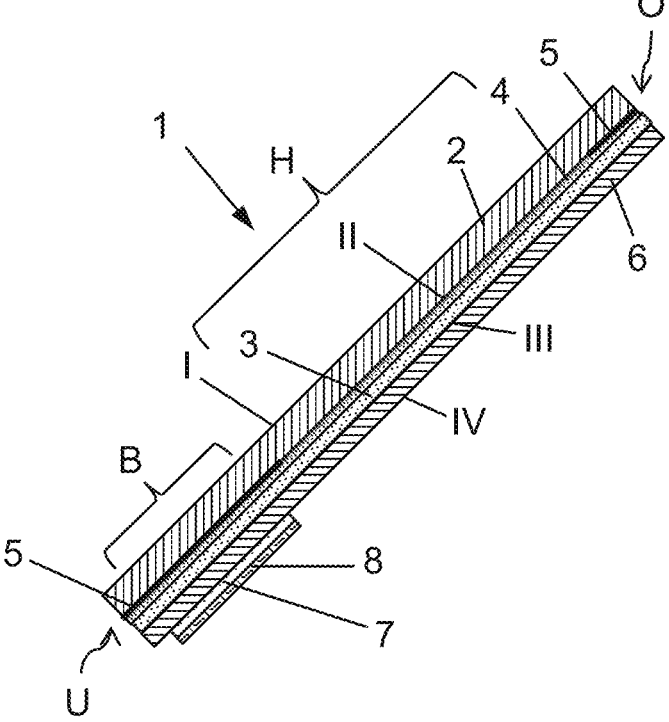
Figure 5:
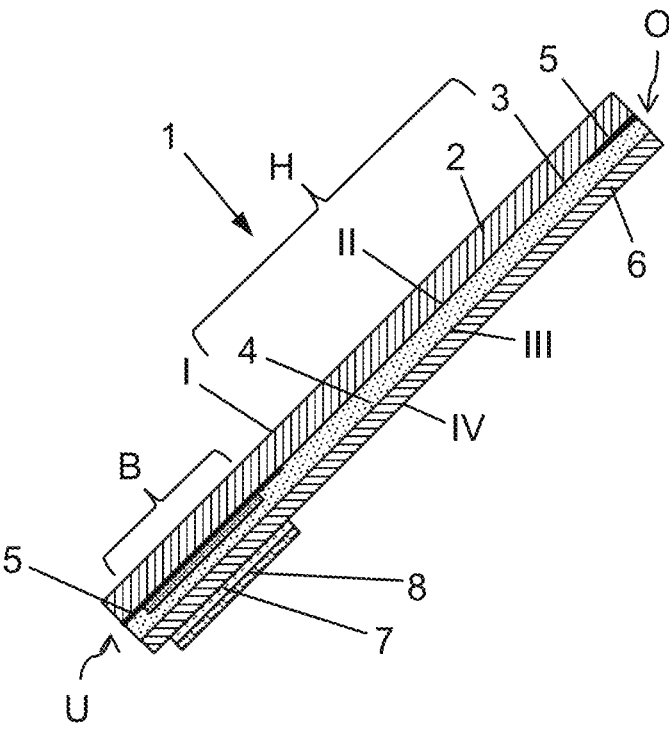
Figure 6:
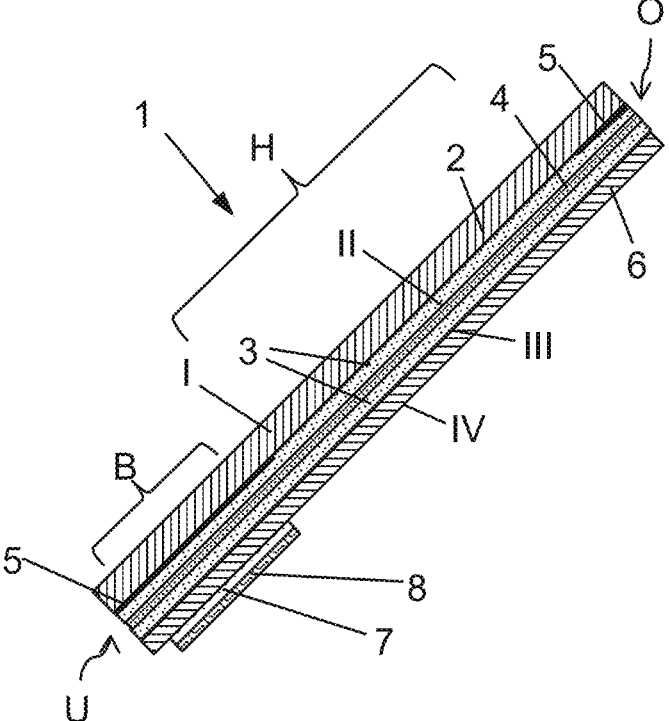
Figure 7:
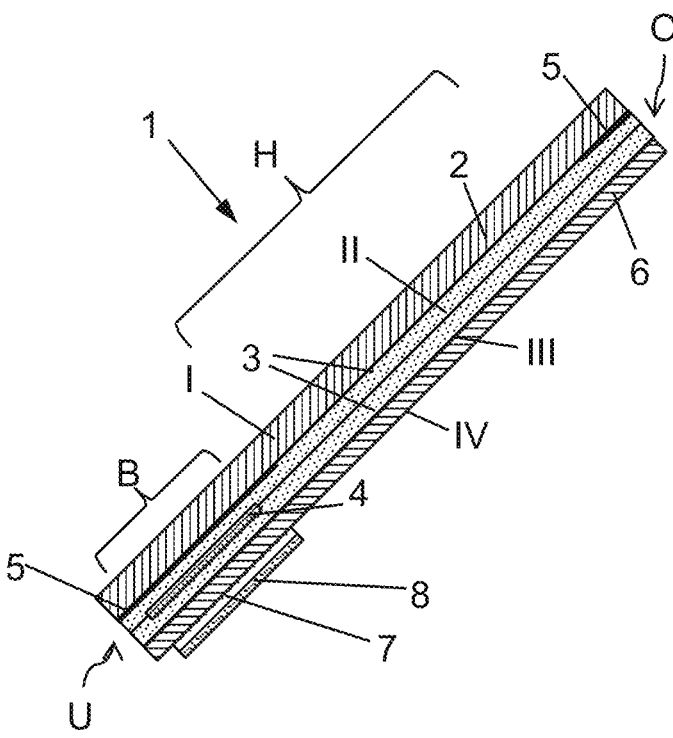
Figure 8:
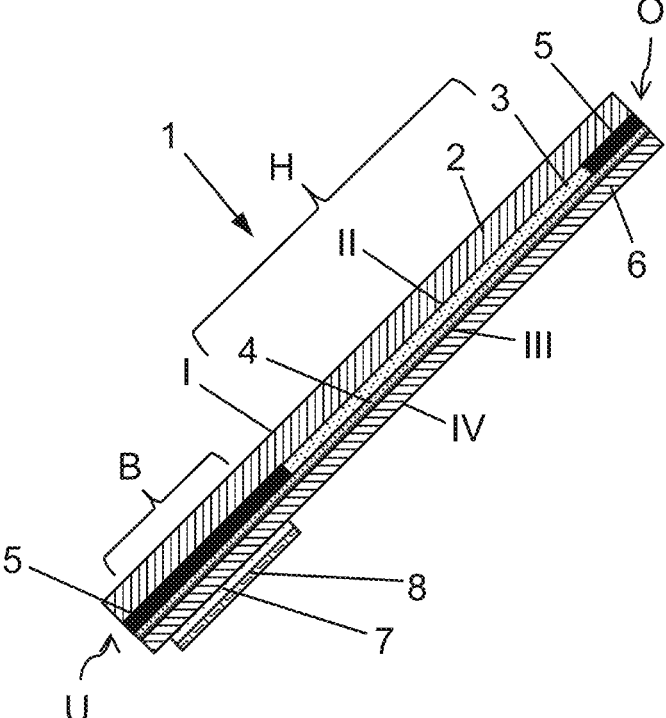
Figure 9:
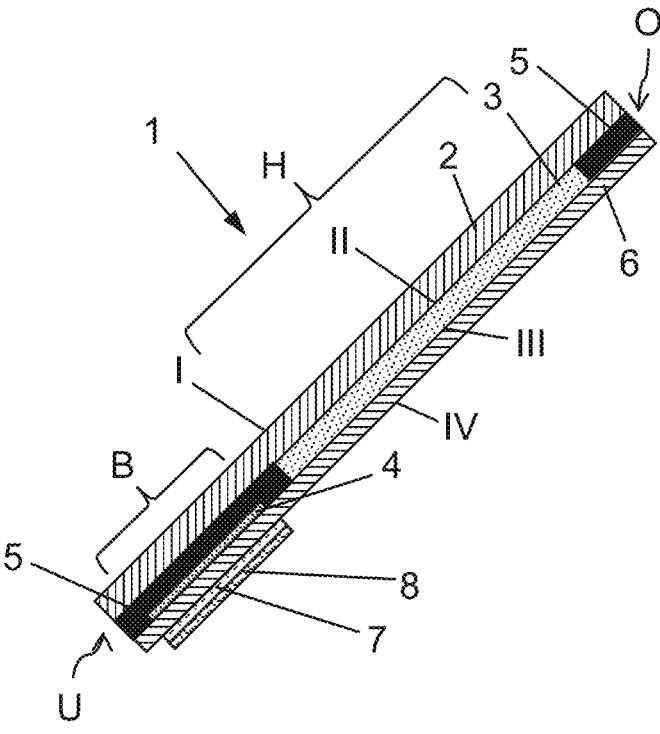
Figure 10:
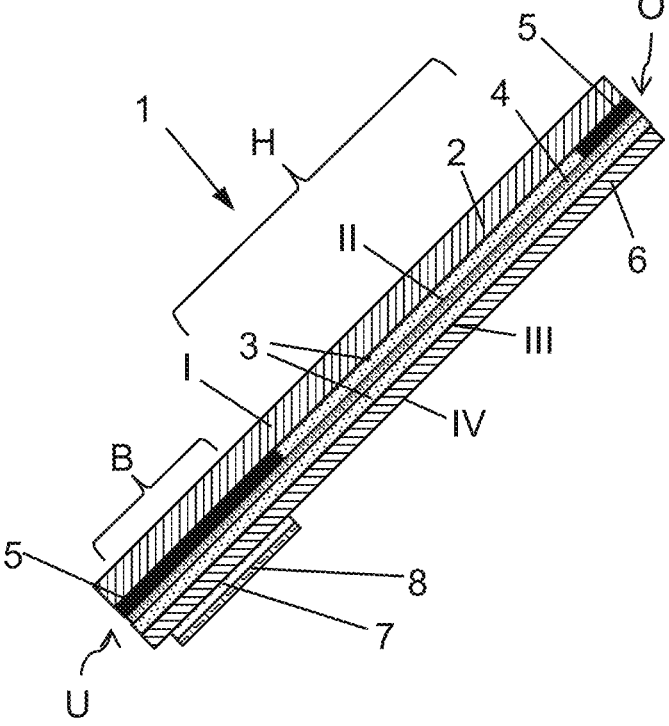
Figure 11:
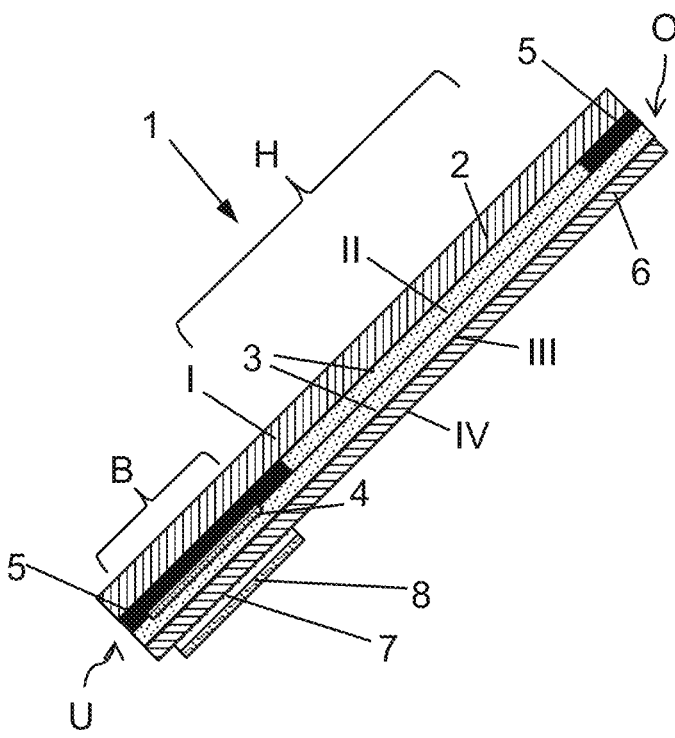
Figure 12:
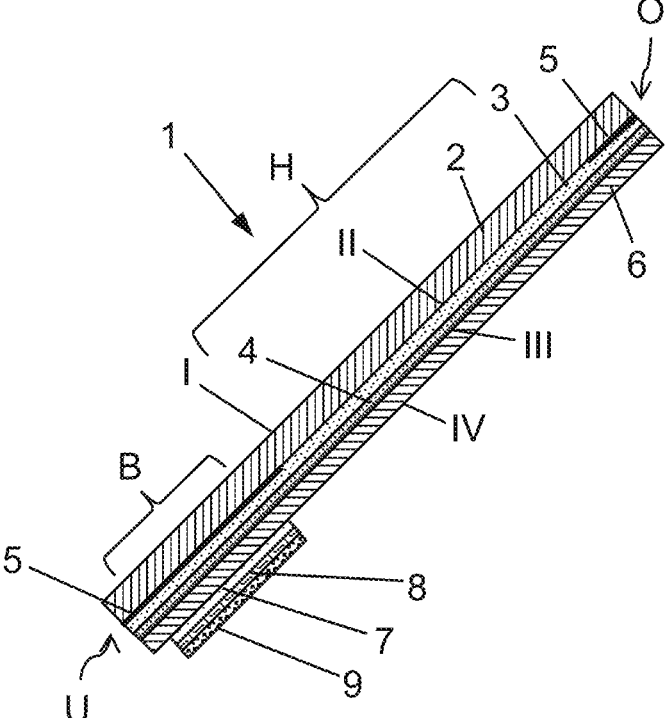
Figure 13:
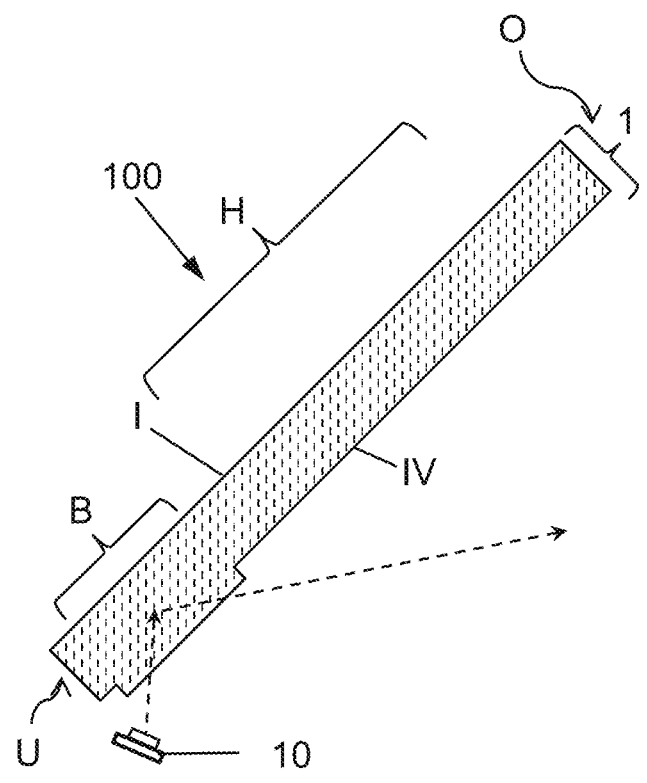
Figure 14:
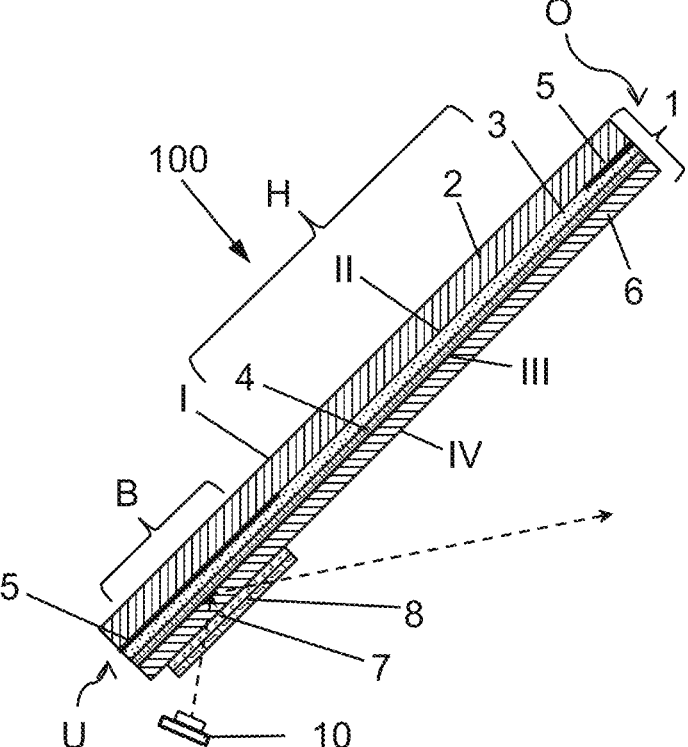
Figure 15:
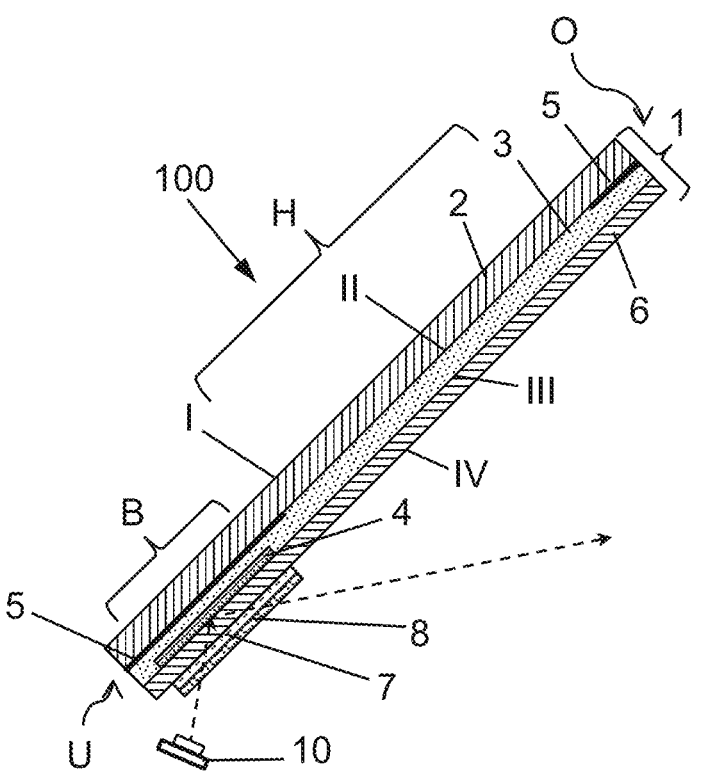
Figure 16:
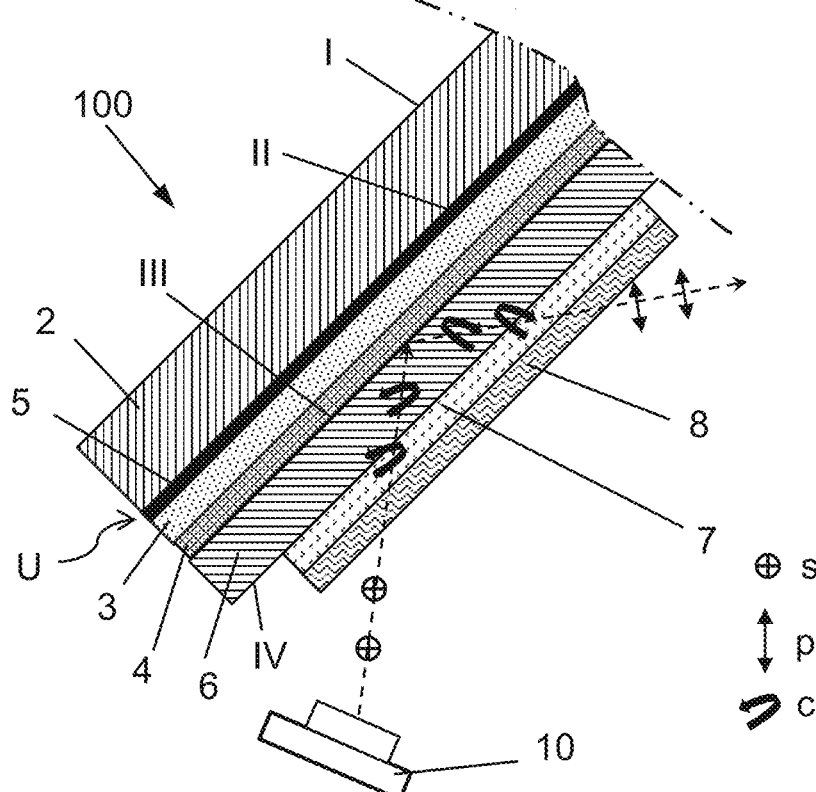
Figure 17:
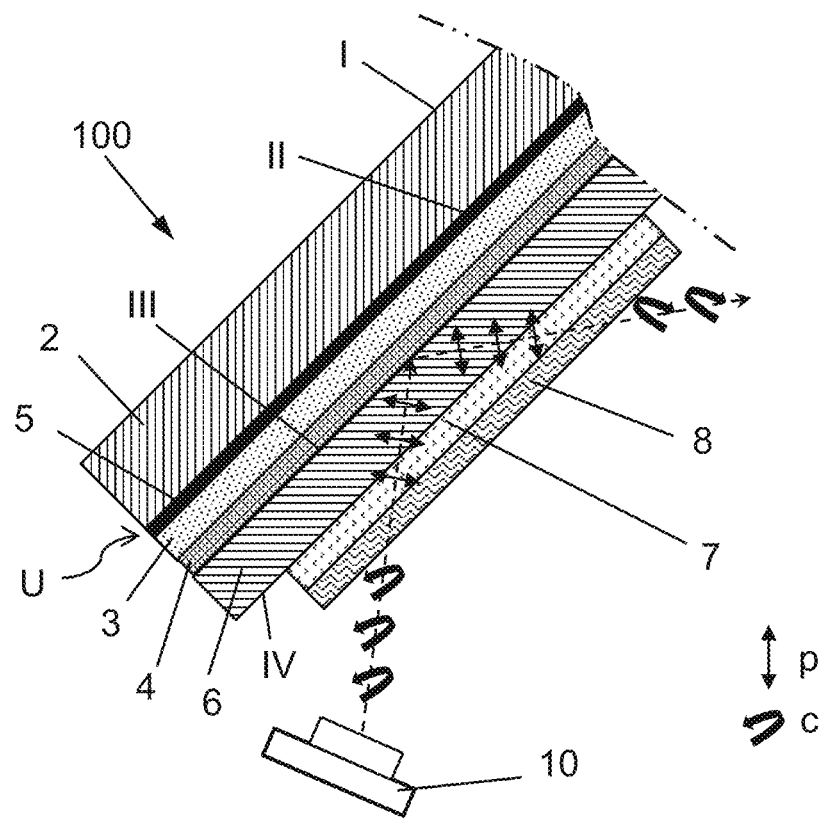

The invention is explained in more detail with reference to drawings and exemplary embodiments. The drawings are schematic representations and are not true to scale. The drawings do not limit the invention in any way. In the figures:

FIG. 1 shows a plan view of an embodiment of a laminated pane according to the invention, FIG. 2 shows a cross section through the embodiment shown in FIG. 1, FIG. 3 shows a cross section through another embodiment of a laminated pane according to the invention, FIG. 4 shows a cross section through another embodiment of a laminated pane according to the invention, FIG. 5 shows a cross section through another embodiment of a laminated pane according to the invention, FIG. 6 shows a cross section through another embodiment of a laminated pane according to the invention, FIG. 7 shows a cross section through another embodiment of a laminated pane according to the invention, FIG. 8 shows a cross section through another embodiment of a laminated pane according to the invention, FIG. 9 shows a cross section through another embodiment of a laminated pane according to the invention, FIG. 10 shows a cross section through a further embodiment of a laminated pane according to the invention, FIG. 11 shows a cross section through another embodiment of a laminated pane according to the invention, FIG. 12 shows a cross section through another embodiment of a laminated pane according to the invention, FIG. 13 shows a cross section through a projection arrangement according to the invention, FIG. 14 shows a cross section through an embodiment of a projection arrangement according to the invention, FIG. 15 shows a cross section through an embodiment of a projection arrangement according to the invention, FIG. 16 shows an enlarged detail of a cross section through an embodiment of a projection arrangement according to the invention, and FIG. 17 shows an enlarged detail of a cross section through another embodiment of a projection arrangement according to the invention.

FIG. 1 shows a plan view of an embodiment of a laminated pane 1 according to the invention, and in FIG. 2 the cross section through the laminated pane 1 shown in FIG. 1 along the cutting line X-X' is shown. The laminated pane 1 shown in FIGS. 1 and 2 has an upper edge O, a lower edge U and two side edges K. In addition, FIG. 1 shows the main see-through region H and the projection region B of the laminated pane 1. The laminated pane 1 shown in FIGS. 1 and 2 comprises an outer pane 2 with an exterior-side surface I and an interior-side surface II, an inner pane 6 with an exterior-side surface III and an interior-side surface IV, a thermoplastic intermediate layer 3, a reflective layer 4, an opaque masking layer 5, an adhesive layer 7, and a λ/4 retardation plate 8. The thermoplastic intermediate layer 3 is arranged between the outer pane 2 and the inner pane 6, the exterior-side surface I of the outer pane 2 faces away from the thermoplastic intermediate layer 3, the interior-side surface II of the outer pane 2 faces the thermoplastic intermediate layer 3, the exterior-side surface III of the inner pane 6 faces the thermoplastic intermediate layer 3, and the interior-side surface IV of the inner pane 6 faces away from the thermoplastic intermediate layer 3. The outer pane 2, the thermoplastic intermediate layer 3, the reflective layer 4, and the inner pane 6 are arranged stacked over one another over the entire surface. The projection region B is arranged outside the main see-through region H. In the embodiment shown in FIGS. 1 and 2, the projection region B is arranged adjacent to the lower edge U. The opaque masking layer 5 is arranged between the outer pane 2 and the inner pane 6 at least in the projection region B and is arranged spatially behind the reflective layer 4 when viewed through the laminated pane 1, starting from the interior-side surface IV of the inner pane. In the embodiment shown in FIGS. 1 and 2, the opaque masking layer 5 is designed as an opaque cover print arranged on the interior-side surface II of the outer pane 2 and is arranged in a peripheral edge region which has a greater width in a section which overlaps with the projection region B than in sections different therefrom. The λ/4 retardation plate 8 is connected via the adhesive layer 7 to the interior-side surface IV of the inner pane 6 and is arranged in a region of the laminated pane 1 which, when viewed perpendicularly through the laminated pane 1, lies completely in the region in which the opaque masking layer 5 is arranged. When viewed perpendicularly through the laminated pane 1, the projection region B lies completely in the region of the laminated pane 1 in which the λ/4 retardation plate is arranged.

The thermoplastic intermediate layer 3 is, for example, an intermediate layer consisting of PVB and has a thickness of 0.76 mm. The thermoplastic intermediate layer 3 has a substantially constant thickness, apart from a possible surface roughness customary in the art—it is not designed as a so-called wedge film.

The outer pane 2 and the inner pane 6 consist, for example, of soda-lime glass. The outer pane 2 has, for example, a thickness of 2.1 mm; the inner pane 6 has, for example, a thickness of 1.6 mm or 1.1 mm.

The adhesive layer 7 is, for example, an optically clear adhesive (OCA). Alternatively, the adhesive layer 7 can also be a thermoplastic polymer layer, for example a layer consisting of PVB with a thickness of, for example, 0.38 mm.

In the embodiment shown in FIGS. 1 and 2, a reflective layer 4, which is designed for example as a thin-film stack comprising at least one electrically conductive layer based on silver, is applied over the entire surface of the exterior-side surface III of the inner pane 6.

FIG. 3 shows a cross section through another embodiment of a laminated pane 1 according to the invention. The embodiment shown in FIG. 3 differs from that shown in FIG. 2 only in that the reflective layer 4 is arranged just in a region of the laminated pane 1 which, when viewed perpendicularly through the laminated pane 1, lies completely in the region in which the opaque masking layer 5 is arranged. In this embodiment, the reflective layer 4 can be designed as a coating of the exterior-side surface III of the inner pane 6 or as a reflective film arranged between the thermoplastic intermediate layer 3 and the inner pane 6.

FIG. 4 shows a cross section through another embodiment of a laminated pane 1 according to the invention. The embodiment shown in FIG. 4 differs from that shown in FIG. 2 only in that the reflective layer 4 is not arranged between the thermoplastic intermediate layer 3 and the inner pane 6, but between the thermoplastic intermediate layer 3 and the outer pane 2, with the proviso that the opaque masking layer 5 is arranged spatially behind the reflective layer 4 when viewed through the laminated pane 1, starting from the interior-side surface IV of the inner pane 6. The reflective layer 4, formed for example as a coating on the interior-side surface II of the outer pane 2, is therefore not arranged directly on the outer pane 2 in the regions in which the opaque masking layer 5 is arranged as an opaque cover print on the interior-side surface II of the outer pane 2, but on the opaque masking layer 5.

FIG. 5 shows a cross section through another embodiment of a laminated pane 1 according to the invention. The embodiment shown in FIG. 5 differs from that shown in FIG. 4 only in that the reflective layer 4 is arranged only in a region of the laminated pane 1 which, when viewed perpendicularly through the laminated pane 1, lies completely in the region in which the opaque masking layer 5 is arranged. In this embodiment, the reflective layer 4 can be designed as a coating of the interior-side surface II of the outer pane 2 or as a reflective film arranged between the thermoplastic intermediate layer 3 and the outer pane 2, with the proviso that the opaque masking layer 5 is arranged spatially behind the reflective layer 4 when viewed through the laminated pane 1, starting from the interior-side surface IV of the inner pane 6. A reflective layer 4 formed as a coating of the interior-side surface II of the outer pane 2 is therefore not arranged directly on the outer pane 2, but rather on the opaque masking layer 5.

FIG. 6 shows a cross section through another embodiment of a laminated pane 1 according to the invention. The embodiment shown in FIG. 6 differs from that shown in FIG. 2 only in that the laminated pane 1 has two thermoplastic intermediate layers 3, and the reflective layer 4 is arranged between the two thermoplastic intermediate layers 3. In this embodiment, the reflective layer 4 can be designed as a coating of one of the two thermoplastic intermediate layers 3 or as a reflective film arranged between the two thermoplastic intermediate layers 3.

FIG. 7 shows a cross section through another embodiment of a laminated pane 1 according to the invention. The embodiment shown in FIG. 7 differs from that shown in FIG. 3 only in that the laminated pane 1 has two thermoplastic intermediate layers 3 and the reflective layer 4 is arranged between the two thermoplastic intermediate layers 3. In this embodiment, the reflective layer 4 can be designed as a coating of one of the two thermoplastic intermediate layers 3 or as a reflective film arranged between the two thermoplastic intermediate layers 3.

FIG. 8 shows a cross section through another embodiment of a laminated pane 1 according to the invention. The embodiment shown in FIG. 8 differs from that shown in FIG. 2 only in that the opaque masking layer 5 is not designed as an opaque cover print on the interior-side surface II of the outer pane 2, but instead is as an opaquely colored region of the thermoplastic intermediate layer 3.

In the region adjacent to the upper edge O, the thermoplastic intermediate layer 3 can alternatively also have no coloring, and optionally an opaque cover print on the interior-side surface II of the outer pane 2, on the exterior-side surface III of the inner pane 6, or on the interior-side surface IV of the inner pane 6, can be applied.

FIG. 9 shows a cross section through another embodiment of a laminated pane 1 according to the invention. The embodiment shown in FIG. 9 differs from that shown in FIG. 8 only in that the reflective layer 4 is arranged only in a region of the laminated pane 1 which, when viewed perpendicularly through the laminated pane 1, lies completely in the region in which the opaque masking layer 5 is arranged. In this embodiment, the reflective layer 4 can be designed as a coating of the exterior-side surface III of the inner pane 6 or as a reflective film arranged between the thermoplastic intermediate layer 3 and the inner pane 6.

FIG. 10 shows a cross section through another embodiment of a laminated pane 1 according to the invention. The embodiment shown in FIG. 10 differs from that shown in FIG. 6 only in that the opaque masking layer 5 is not formed as an opaque cover print on the interior-side surface II of the outer pane 2, but as an opaquely colored region of the thermoplastic intermediate layer 3 closest to the outer pane 2.

In the region adjacent to the upper edge O, the thermoplastic intermediate layer 3 closest to the outer pane 2 can alternatively also have no coloring, and optionally an opaque cover print on the interior-side surface II of the outer pane 2, on the exterior-side surface III of the inner pane 6 or on the interior-side surface IV of the inner pane 6, can be applied.

FIG. 11 shows a cross section through another embodiment of a laminated pane 1 according to the invention. The embodiment shown in FIG. 11 differs from that shown in FIG. 10 only in that the reflective layer 4 is arranged only in a region of the laminated pane 1 which, when viewed perpendicularly through the laminated pane 1, lies completely in the region in which the opaque masking layer 5 is arranged. In this embodiment, the reflective layer 4 can be designed as a coating of one of the two thermoplastic intermediate layers 3 or as a reflective film arranged between the two thermoplastic intermediate layers 3.

FIG. 12 shows a cross section through another embodiment of a laminated pane 1 according to the invention. The embodiment shown in FIG. 12 differs from that shown in FIG. 2 only in that a coating 9 is arranged on the surface of the λ/4 retardation plate 8 facing away from the adhesive layer 7, and is designed as a protective coating or an anti-reflection coating.

FIG. 13 shows a cross-section through a projection arrangement 100 according to the invention. The projection arrangement 100 shown in FIG. 13 comprises a laminated pane 1 according to the invention and an image display device 10. The laminated pane 1 according to the invention is designed, for example, as shown in FIGS. 2 to 12. The image display device 10 is directed toward the projection region B and arranged in such a way that the interior-side surface IV of the inner pane 6 is the surface of the inner pane 6 closest to the image display device 10.

FIG. 14 shows a cross section through an embodiment of a projection arrangement 100 according to the invention, comprising a laminated pane 1 and an image display device 10. The laminated pane 1 is designed as shown in FIG. 2. The laminated pane 1 of the projection arrangement 100 shown in FIG. 14 has an upper edge O, a lower edge U and two side edges K. In addition, FIG. 14 shows the main see-through region H and the projection region B of the laminated pane 1. In the embodiment of a projection arrangement 100 shown in FIG. 14, the laminated pane 1 comprises an outer pane 2 with an exterior-side surface I and an interior-side surface II, an inner pane 6 with an exterior-side surface III and an interior-side surface IV, a thermoplastic intermediate layer 3, a reflective layer 4, an opaque masking layer 5, an adhesive layer 7, and a λ/4 retardation plate 8. The thermoplastic intermediate layer 3 is arranged between the outer pane 2 and the inner pane 6, the exterior-side surface I of the outer pane 2 faces away from the thermoplastic intermediate layer 3, the interior-side surface II of the outer pane 2 faces the thermoplastic intermediate layer 3, the exterior-side surface III of the inner pane 6 faces the thermoplastic intermediate layer, and the interior-side surface IV of the inner pane 6 faces away from the thermoplastic intermediate layer. The outer pane 2, the thermoplastic intermediate layer 3, the reflective layer 4, and the inner pane 6 are arranged stacked over one another over the entire surface. The projection region B is arranged outside the main see-through region H. In the embodiment shown in FIG. 14, the projection region B is arranged adjacent to the lower edge U. The opaque masking layer 5 is arranged between the outer pane 2 and the inner pane 6 at least in the projection region B and is arranged spatially behind the reflective layer 4 when viewed through the laminated pane 1, starting from the interior-side surface IV of the inner pane. The opaque masking layer 5 is designed as an opaque cover print arranged on the interior-side surface II of the outer pane 2 and is arranged in a peripheral edge region which has a greater width in a section which overlaps with the projection region B than in sections different therefrom. The λ/4 retardation plate is connected via the adhesive layer 7 to the interior-side surface IV of the inner pane 6 and is arranged in a region of the laminated pane 1 which, when viewed perpendicularly through the laminated pane 1, lies completely in the region in which the opaque masking layer 5 is arranged. The projection region B lies completely in the region of the laminated pane 1 in which the λ/4 retardation plate 8 is arranged, when viewed perpendicularly through the laminated pane 1.

The thermoplastic intermediate layer 3 is, for example, an intermediate layer consisting of PVB and has a thickness of 0.76 mm. The thermoplastic intermediate layer 3 has a substantially constant thickness, apart from a possible surface roughness customary in the art—it is not designed as a so-called wedge film.

The outer pane 2 and the inner pane 6 consist, for example, of soda-lime glass. The outer pane 2 has, for example, a thickness of 2.1 mm; the inner pane 6 has, for example, a thickness of 1.6 mm or 1.1 mm.

The adhesive layer 7 is, for example, an optically clear adhesive (OCA). Alternatively, the adhesive layer 7 can also be a thermoplastic polymer layer, for example a layer consisting of PVB with a thickness of, for example, 0.38 mm.

In the embodiment shown in FIG. 14, a reflective layer 4, which is designed for example as a thin-film stack comprising at least one electrically conductive layer based on silver, is applied over the entire surface of the exterior-side surface III of the inner pane 6.

FIG. 15 shows a cross section through another embodiment of a projection arrangement 100 according to the invention, wherein the embodiment shown in FIG. 15 differs from that in FIG. 14 only in that the reflective layer 4 is arranged only in a region of the laminated pane 1 which, when viewed perpendicularly through the laminated pane 1, lies completely in the region in which the opaque masking layer 5 is arranged. In this embodiment, the reflective layer 4 can be designed as a coating of the exterior-side surface III of the inner pane 6 or as a reflective film arranged between the thermoplastic intermediate layer 3 and the inner pane 6. In the embodiment shown in FIG. 15, the laminated pane 1 is therefore designed as shown in FIG. 3.

FIG. 16 shows an enlarged detail of a cross section through an embodiment of a projection arrangement 100 according to the invention comprising a laminated pane 1 and an image display device 10, wherein the beam path of the light emitted by the image display device 10 is shown in more detail. The laminated pane 1 is designed as shown in FIGS. 1 and 2. The image display device 10 emits s-polarized light. Said light first strikes the λ/4 retardation plate 8 and is converted thereby into circularly polarized light and strikes the reflective layer 4. The circularly polarized light is reflected by the reflective layer 8, wherein the direction of rotation changes. Before the reflected circularly polarized light leaves the laminated pane 1, this again passes through the λ/4 retardation plate 8 and is converted into p-polarized light. Since only p-polarized light emerges from the laminated pane 1, the reflection is also very perceivable by a viewer who wears polarization-selective sun glasses.

FIG. 17 shows an enlarged detail of a cross section through another embodiment of a projection arrangement 100 according to the invention comprising a laminated pane 1 and an image display device 10, wherein the beam path of the light emitted by the image display device 10 is shown in more detail. The laminated pane 1 is designed as shown in FIGS. 1 and 2. The image display device 10 emits circularly polarized light. Said light first strikes the λ/4 retardation plate 8 and is converted by the latter into p-polarized light and strikes the reflective layer 4. The p-polarized light is reflected by the reflective layer 4. Before the reflected p-polarized light leaves the laminated pane 1, it passes again through the λ/4 retardation plate 8 and is converted into circularly polarized light. The circularly polarized light is also very perceivable by a viewer who wears polarization-selective sun glasses.

LIST OF REFERENCE SIGNS

1 laminated pane
2 outer pane
3 thermoplastic intermediate layer
4 reflective layer
5 opaque masking layer
6 inner pane
7 adhesive layer
8 λ/4 retardation plate
9 coating
10 image display device
100 projection arrangement
O upper edge
U lower edge
K side edge
B projection region
H main see-through region
I exterior-side surface of the outer pane 2
II interior-side surface of the outer pane 2
III E exterior-side surface of the inner pane 6
IV interior-side surface of the inner pane 6
X'-X cutting line
S s-polarized light
p p-polarized light
c circularly polarized light

The invention claimed is:

1. A laminated pane having a projection region, a main see-through region, an upper edge, a lower edge and two lateral pane edges, at least comprising an outer pane, at least one thermoplastic intermediate layer, a reflective layer, an opaque masking layer, an inner pane, an adhesive layer, and a λ/4 retardation plate, wherein the outer pane has an exterior-side surface facing away from the at least one thermoplastic intermediate layer, and an interior-side surface facing the at least one thermoplastic intermediate layer, and the inner pane has an exterior-side surface facing the at least one thermoplastic intermediate layer and an interior-side surface facing away from the at least one thermoplastic intermediate layer, the projection region is arranged outside the main see-through region, the reflective layer is arranged at least in the projection region between the outer pane and the inner pane, the opaque masking layer is arranged at least in the projection region between the outer pane and the inner pane and, when viewed through the laminated pane, is arranged spatially behind the reflective layer, starting from the interior-side surface of the inner pane, the $\lambda/4$ retardation plate is connected via the adhesive layer to the interior-side surface of the inner pane and is arranged in a region of the laminated pane which, when viewed perpendicularly through the laminated pane, lies completely in the region in which the opaque masking layer is arranged, and the projection region lies completely in the region of the laminated pane in which the $\lambda/4$ retardation plate is arranged, when viewed perpendicularly through the laminated pane.

2. The laminated pane according to claim 1, wherein the reflective layer is arranged substantially over the entire surface between the outer pane and the inner pane.

3. The laminated pane according to claim 1, wherein the reflective layer is arranged between the outer pane and the inner pane in a region of the laminated pane which, when viewed perpendicularly through the laminated pane, lies completely in the region in which the opaque masking layer is arranged.

4. The laminated pane according to claim 1, wherein the reflective layer is arranged between the inner pane and the at least one thermoplastic intermediate layer or between the outer pane and the at least one thermoplastic intermediate layer, or wherein the laminated pane comprises at least two thermoplastic intermediate layers and the reflective layer is arranged between two of the thermoplastic intermediate layers.

5. The laminated pane according to claim 1, wherein the adhesive layer is a thermoplastic polymer layer or an optically clear adhesive.

6. The laminated pane according to claim 1, wherein the projection region is arranged adjacent to the lower edge of the laminated pane.

7. The laminated pane according to claim 1, wherein the opaque masking layer is arranged at least partially in a peripheral edge region.

8. The laminated pane according to claim 7, wherein the opaque masking layer has in a section which overlaps with the projection region a greater width than in sections different therefrom.

9. The laminated pane according to claim 1, wherein the opaque masking layer is designed as an opaque cover print on the interior-side surface of the outer pane or as an opaquely colored region of the at least one thermoplastic intermediate layer.

10. The laminated pane according to claim 1, wherein the reflective layer is designed as a reflective coating or as a reflective film.

11. The laminated pane according to claim 1, additionally comprising a coating which is designed as a protective coating or an anti-reflection coating and is arranged on the surface of the $\lambda/4$ retardation plate facing away from the adhesive layer.

12. A projection arrangement comprising:

a laminated pane according to claim 1, and an image display device which is directed toward the projection region and is arranged in such a way that the interior-side surface of the inner pane is the surface of the inner pane closest to the image display device.

13. The projection arrangement according to claim 12, wherein the image display device is a projector or a display.

14. The projection arrangement according to claim 13, wherein the display is an LCD display, a LED display, a microLED display, an OLED display or an electroluminescent display.

15. The projection arrangement according to claim 13, wherein the radiation strikes the laminated pane at an angle of incidence of 55° to 80°.

16. The projection arrangement according to claim 15, wherein the radiation strikes the laminated pane at an angle of incidence of 62° to 77°.

17. The projection arrangement according to claim 12, wherein the image display device emits s-polarized light.

18. The projection arrangement according to claim 12, wherein the image display device emits circularly polarized light.

19. A method comprising providing a laminated pane according to claim 1 as a vehicle pane in means of transport for traffic on land, in the air or on water.

20. The method according to claim 19, wherein the vehicle pane is a windshield for a head-up display.

* * * * *